United States Patent
Stojanovic

(10) Patent No.: US 11,018,908 B2
(45) Date of Patent: May 25, 2021

(54) PULSE AMPLITUDE MODULATION LEVEL OPTIMIZATION AND EQUALIZATION IN OPTICAL SYSTEMS

(71) Applicant: Huawei Technologies Co., Ltd., Shenzhen (CN)

(72) Inventor: Nebojsa Stojanovic, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/719,007

(22) Filed: Dec. 18, 2019

(65) Prior Publication Data

US 2020/0119957 A1    Apr. 16, 2020

Related U.S. Application Data

(63) Continuation of application No. PCT/EP2017/065767, filed on Jun. 27, 2017.

(51) Int. Cl.
*H04B 10/54* (2013.01)
*H04L 25/49* (2006.01)
*H04L 25/03* (2006.01)

(52) U.S. Cl.
CPC ....... *H04L 25/4927* (2013.01); *H04B 10/541* (2013.01); *H04L 25/03343* (2013.01)

(58) Field of Classification Search
CPC .................................................. H04B 10/541
See application file for complete search history.

(56) References Cited

U.S. PATENT DOCUMENTS

| 6,992,609 B1* | 1/2006 | Zelenin | H03M 1/745 |
| | | | 341/136 |
| 2003/0180055 A1 | 9/2003 | Azadet | |

(Continued)

FOREIGN PATENT DOCUMENTS

| CN | 102065037 A | 5/2011 |
| CN | 105187112 A | 12/2015 |

(Continued)

OTHER PUBLICATIONS

Romeira, B., et al., "Observation of Switching and Pulsed Behaviour in a Noise-Driven Resonant Tunneling Diode Excitable Optoelectronic Oscillator," Apr. 21, 2014, 1 page.

(Continued)

*Primary Examiner* — Shi K Li
(74) *Attorney, Agent, or Firm* — Conley Rose, P.C.

(57) ABSTRACT

An optical communication system includes a transmission side system for multi-level pulse amplitude modulation (PAM) and a corresponding receiver side system, where the transmission side comprises a laser source providing an optical beam, a signal source of electrical signals to be modulated onto the optical beam, and a modulator coupled to the laser source and the signal source to modulate the electrical signals onto the optical beam using amplitude modulation and at least four signal levels, wherein the at least four signal levels are non-uniformly distributed. The receiver side includes a corresponding equalizer which is implemented as a filter of the form $f_1 y + f_2 y^2 + f_0$, where y is the incoming signal and the parameters $f_0$, $f_1$ and $f_2$ are obtained using an adaptive filter.

20 Claims, 8 Drawing Sheets

(56) References Cited

U.S. PATENT DOCUMENTS

| | | | |
|---|---|---|---|
| 2013/0231270 A1 | 9/2013 | Kaminski et al. | |
| 2015/0171963 A1* | 6/2015 | Bhoja | H04B 10/40 398/115 |
| 2016/0352427 A1* | 12/2016 | Anandakumar ... | H04B 10/2507 |
| 2019/0158222 A1* | 5/2019 | Kurmaev ......... | H03M 13/6362 |

FOREIGN PATENT DOCUMENTS

| | | |
|---|---|---|
| CN | 106130660 A | 11/2016 |
| CN | 106230505 A | 12/2016 |
| EP | 2903187 A1 | 8/2015 |
| WO | 2016144927 A1 | 9/2016 |

OTHER PUBLICATIONS

Foreign Communication From a Counterpart Application, PCT Application No. PCT/EP2017/065767, English Translation of International Search Report dated Mar. 7, 2018, 6 pages.

Foreign Communication From a Counterpart Application, PCT Application No. PCT/EP2017/065767, English Translation of Written Opinion dated Mar. 7, 2018, 9 pages.

\* cited by examiner

PULSE AMPLITUDE MODULATION LEVEL OPTIMIZATION AND EQUALIZATION IN OPTICAL SYSTEMS

CROSS-REFERENCE TO RELATED APPLICATIONS

This application is a continuation of International Patent Application No. PCT/EP2017/065767 filed on Jun. 27, 2017, which is hereby incorporated by reference in its entirety.

TECHNICAL FIELD

The present disclosure, in some embodiments thereof, relates to the use of pulse amplitude modulation (PAM) in optical transmission links, and, more particularly, but not exclusively, to 4-level PAM (PAM-4), for direct-detection (DD) optical transmission links to improve performance in systems affected by optical noise and intersymbol interference (ISI).

BACKGROUND

Next-generation ultra-high-speed short reach optical fiber links are expected to utilize small, cheap, and low power consumption transceivers in order to conform to requirements that are mainly imposed by the limited space of data center equipment. These transceivers are expected to support intra- and inter-data centers connections front a few hundred meters up to several tens of kilometers, respectively.

An aim is to transmit 100 gigabits per second (Gbps) per wavelength. However such an aim is very challenging when a very cheap solution is required at the same time. The coherent approach is currently out of scope as it requires high power and expensive devices. Therefore, intensity modulation (IM) and DD schemes are preferred. The mature on-off keying modulation format, widely used in non-coherent systems has been also investigated for applications at 100 Gbps per wavelength speed. However, such a solution would require expensive high-bandwidth optics and electronics. To overcome this drawback, advanced modulation formats supported by digital signal processing (DSP) have been investigated as an alternative technology to support 100-G, the most promising candidates being PAM-4, discrete multi-tone modulation (DMT), and carrier-less amplitude and pulse modulation. As the PAM-4 format requires a simple DSP this format has seriously been considered by many standardization bodies.

The PAM-4 format can even be used in longer links in which chromatic dispersion (CD) is compensated using dispersion compensation fibers (DCF) or dispersion compensation modules (DCM). An in-phase and a quadrature (IQ) modulator can also do CD pre-compensation at the transmitter side. In asymmetrical links, PAM-4 signal can be sent by intensity modulator and received by coherent receiver that will do CD post-compensation.

The state of the art 10 Gbps optical transponder uses a very cheap distributed feedback laser (DFB) together with an electro-absorption modulator (EAM) integrated in transmitter optical subassemblies (TOSAs). The power of the optical signal is almost proportional to the electrical signal modulating the laser. At the receiver side, a photo diode (such as positive-intrinsic negative (PIN) or avalanche photo diode (APD)) detects the optical signal. Output of the photo diode is proportional to the power of the optical signal. The photo diode output is amplified using a trans-impedance amplifier (TIA). The photo diode and TIA can be integrated in receiver optical subassemblies (ROSAs) that may include an automatic gain control circuit (AGC) to adjust the electrical signal to an analog-to-digital converter (ADC) input when electronic equalization is used.

One typical IM DD transmission system 10 is presented in FIGS. 1A, 1B and 1C. Data 12 are amplified using a modulator driver (MD) 14. DFB 16 and EAM 18 are responsible for modulation. The optical signal is transmitted over several spans 20, each consisting of fiber 22, an erbium-doped fiber amplifier (EDFA) or other types of optical amplifiers and DCFs combined in a unit 24. An optical front end (OFE) 28 includes a photo detector 34 and amplifier 36, and is usually integrated in a ROSA 30. The signal may suffer from residual CD, polarization mode dispersion (PMD), and narrow electrical bandwidth and may thus be equalized using an equalizer 38. In the known art the equalizer may be a feed-forward equalizer (FFE), a DFE, a maximum likelihood sequence estimator (MLSE), or a combination thereof and is part of a clock and data recovery block (CDR) 32. The system of FIG. 1A is used for transmitting a 2-level signal. However, multilevel signal such as PAM-4 can also be transmitted although it requires a higher optical signal-to-noise ratio (OSNR) for successful reception and can only reach shorter distances.

A problem arises with optical amplifiers, which are used in longer links to compensate for fiber loss. EDFAs working in the saturation mode are commonly used in many networks, and are sources of Gaussian noise which tends to be the main source of noise in the system. The noise problem is compounded when using multi-level PAM where a square law applies to signal detection. Thus the theoretically optimum PAM-4 values in the presence of optical noise are 0, 1/3, 2/3, and 1. After DD they become 0, 1/9, 4/9, and 1, due to the squaring, with the result that the levels cease to be evenly distributed and on the contrary, the first two levels are very close to each other. Serious ISI is compensated by FFE, but because the levels are so close, the compensation necessary may seriously degrade system performance such that a problem arises in how to set the optimum levels for multi-level PAM in such systems.

SUMMARY

It is an object of the present embodiments to provide an optical transmitter and receiver and communication apparatus and method. The foregoing and other objects are achieved by the features of the independent claims. Further implementation forms are apparent from the dependent claims, the description and the figures.

An improved and more optimal amplitude mapping and equalization for signal recovery of optical multi-level PAM may be provided. The embodiments are worked out in detail for PAM-4 but the same considerations may be applied to multi-level PAM in general and PAM-8, PAM-16 in particular.

The optimum mapping decreases the power of the inner ones of the multiple PAM levels, as will be explained below, thereby to enable better signal performance.

In embodiments the PAM levels are unevenly distributed over the signal space so that they become evenly distributed after squaring and equalization.

The embodiments may particularly apply to optically amplified links with amplifiers working in saturation mode and at constant output power.

The mapping of the present embodiments may optimize the bit error rate (BER) or BER performance in the amplified spontaneous emission (ASE) dominating scenario that is where the noise is dominated by optical Gaussian noise from the amplifiers en route.

The mapping of the present embodiments may be implemented using a DAC and a three-tap equalizer.

According to an aspect of some embodiments of the present disclosure there is provided an optical transmission system for multi-level PAM, comprising a laser source providing an optical beam, a signal source of electronic signals to be modulated onto the optical beam, and a modulator connected to the laser source and the signal source, to modulate the electronic signals onto the optical beam using amplitude modulation and at least four signal levels, wherein the at least four signal levels are non-uniformly distributed. The uneven distribution of signal levels at the sending end ensures even distribution at the receiving end after equalization.

In an embodiment, the at least four non-uniformly distributed signal levels are distributed such that upon squaring and transformation, the signal levels are substantially uniformly distributed. This has the advantage of overcoming the square law that operates in respect of reception and noise addition.

In an embodiment, the signal levels are selected to minimize a BER based on a given standard noise deviation added to the signal.

In an embodiment, an initial signal level selection uses a pre-estimated standard noise deviation, and the transmission may obtain actual standard deviations to update the signal level selection. Thus a dynamic transmission system is provided which is able to respond to changes in noise conditions.

In an embodiment, the actual standard deviation is obtained from:

$$\sigma = \frac{1}{4}\sum_{i=0}^{3} \sigma_i / \text{abs}(2(ax_i^{1/2} + 2bx_i^{3/2})),$$

where a, b and $x_i$ values are measured from the received signal and $\sigma_i$ values are estimated from histograms around four reconstructed levels.

In an embodiment, the at least four levels are 0, 0.2346, 0.5297, and 1. In another example, the at least four levels are 0, 0.0985, 0.2044, 0.3198, 0.4478, 0.5937, 0.7681, and 1. In the dynamic system referred to above, these levels may advantageously be used as the initial levels.

An embodiment may be incorporated into a TOSA.

An embodiment may carry out the modulation using a digital analog converter. Two bits are needed for uniform mapping and a total of at least six input bits may be used for optimal level mapping according to the present embodiments.

For an embodiment using PAM-8, three input bits are needed in the DAC for uniform mapping, and one more bit is required as a minimum for optimizing the level distribution. In practice seven or more input buts may be used.

The receiving system may use an equalizer to equalize a multi-level PAM signal wherein the levels are unevenly distributed.

In an embodiment, the equalizer is an implementation of a filter.

$$f_1 y + f_2 y^2 + f_0,$$

where y is the incoming signal and parameters $f_0$, $f_1$ and $f_2$ are obtained using an adaptive filter.

In an embodiment:

$$g = f_1 y + f_2 y^2 + f_0 = ax + bx^2$$

$$f_1 = (a - 2cd)/c$$

$$f_2 = b/c^2$$

$$f_0 = -d(a - 2cd)/c - d^2,$$

in which a, b are predetermined or otherwise known, y is the received signal and c and d are unknown.

In an embodiment, the incoming signal is scaled by a factor K and biased by $K_0$. This has the advantage of providing a more easily manageable output.

In an embodiment, the equalizer is an implementation of a second order Volterra filter. The filter is discussed in the literature and clearly defined, thus simplifying implementation.

In an embodiment, the equalizer is a three-tap equalizer which allows for simple implementation.

According to a second aspect of the present embodiments there is provided an optical communication system for multi-level PAM comprising the optical transmission system combined with the optical receiving system.

According to a third aspect of the present disclosure there is provided an optical transmission method for multi-level PAM, comprising providing an optical beam, providing electronic signals to be modulated onto the optical beam, and modulating the electronic signals onto the optical beam using amplitude modulation and at least four signal levels, wherein the at least four signal levels are non-uniformly distributed.

In an embodiment, the at least four non-uniformly distributed signal levels are distributed such that upon squaring and transformation, the signal levels are substantially uniformly distributed.

The method may involve selecting the signal levels to minimize a BER based on a given standard noise deviation added to the signal.

The method may comprise using a pre-estimated standard deviation to make an initial level distribution, and obtaining actual standard deviations from a received signal to update the signal level selection.

According to a fourth aspect of the present disclosure there is provided an optical receiving method comprising equalizing a multi-level PAM signal wherein the levels are unevenly distributed.

According to a fifth aspect of the present disclosure there is provided an optical communication method for multi-level PAM comprising the optical transmission method combined with the optical receiving method.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

DESCRIPTION OF THE EMBODIMENTS

As explained in the background, the present disclosure, in some embodiments thereof, relates to the use of PAM in optical transmission links, and, more particularly, but not exclusively, to PAM-4, for DD optical transmission links to improve performance in systems affected by optical noise.

Figure 1A:
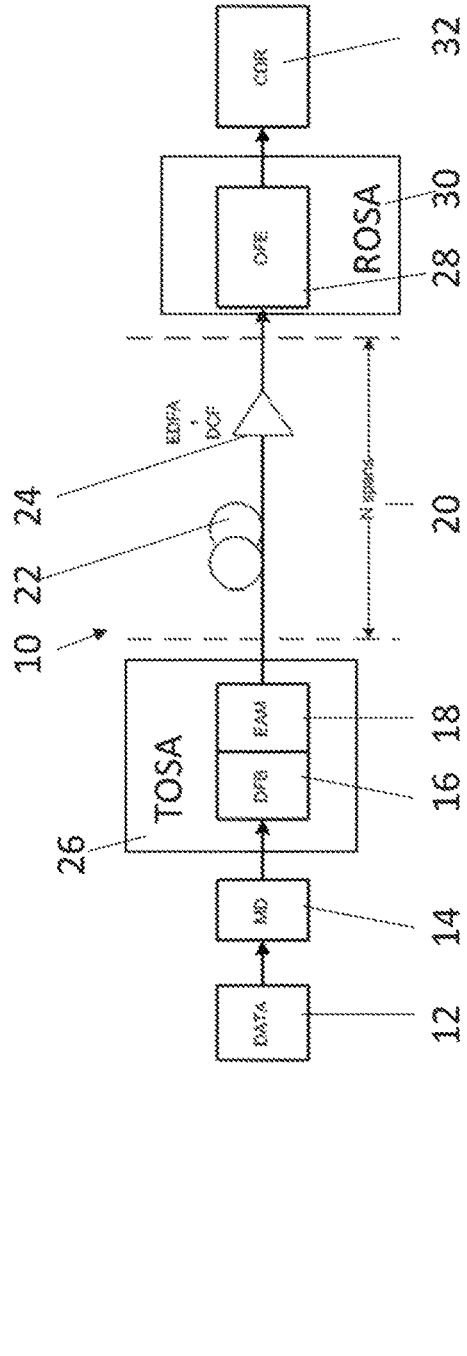
FIG. 1A is a diagram of an optical communication system according to the conventional art.
Figure 1C:
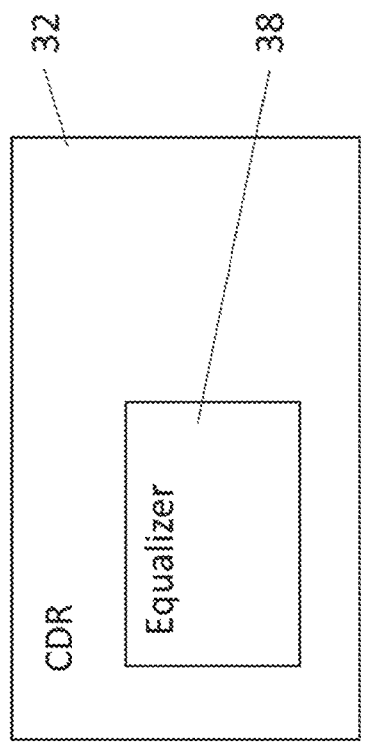
FIG. 1C is another part of the receiving system of FIG. 1A.
Figure 1B:
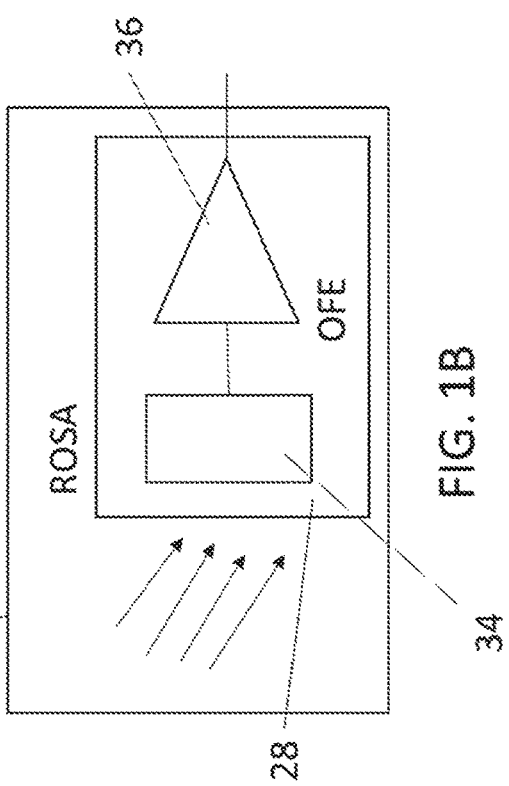
FIG. 1B is a part of the receiving system of FIG. 1A.

For purposes of better understanding some embodiments of the present disclosure, as illustrated in FIGS. 2-11 of the drawings, reference is first made to the construction and operation of a typical IM DD transmission system 10 as presented in FIGS. 1A, 1B and 1C. As explained in the background, data 12 are amplified using a MD 14. DFB 16 and EAM 18, contained in a TOSA 26, are responsible for modulation. The optical signal is transmitted over several spans 20, each consisting of fiber 22, an EDFA or other types of optical amplifiers and DCF combined in a unit 24. An OFE 28 includes a photo detector 34 and amplifier 36, and is usually integrated in a ROSA 30. The signal may suffer from residual CD, PMD, and narrow electrical bandwidth and may thus be equalized using an equalizer 38. In the known art the equalizer may be an FFE, a decision feed-back equalizer (DFE), an MLSE, or a combination thereof and is part of a CDR 32. As explained, the system of FIGS. 1A-1C was previously used for transmitting a 2-level signal. However, multilevel signal such as PAM-4 can also be transmitted although it requires a higher OSNR for successful reception and can only reach shorter distances.

As explained in the background, a problem arises with optical amplifiers, which are used in longer links to compensate for fiber loss. EDFAs working in the saturation mode are commonly used in many networks.

The principal source of noise in EDFAs is ASE, which has a spectrum which is approximately the same as the gain spectrum of the amplifier. This noise is normally considered as Gaussian noise. The performance of optically amplified links is usually characterized by BER versus OSNR.

We can neglect transmitter and receiver noise as this noise is much smaller than ASE noise at higher BER values when a forward error correction (FEC) is used. So, the transmitted signal is affected by ASE noise and after square-low photo detection three different signals are generated. Some of them decrease BER performance. For the sake of simplicity, let us assume that the transmitted signal and noise are real to avoid conjugate operation although the same rules hold for the complex signal scenario. When a multilevel signal is transmitted, such as PAM-4, the optical field is proportional to the square-root of the signal that is the case when an electro-absorption modulated laser (EML) is used. In this case, we have:

$$y=(x+n)^2=x^2+2xn+n^2.$$

The first term represents the sent signal while other two terms are related to signal-ASE beating and ASE-ASE beating. The last two terms are significant for system performance as will be discussed in the detailed embodiments below.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

Figure 2:
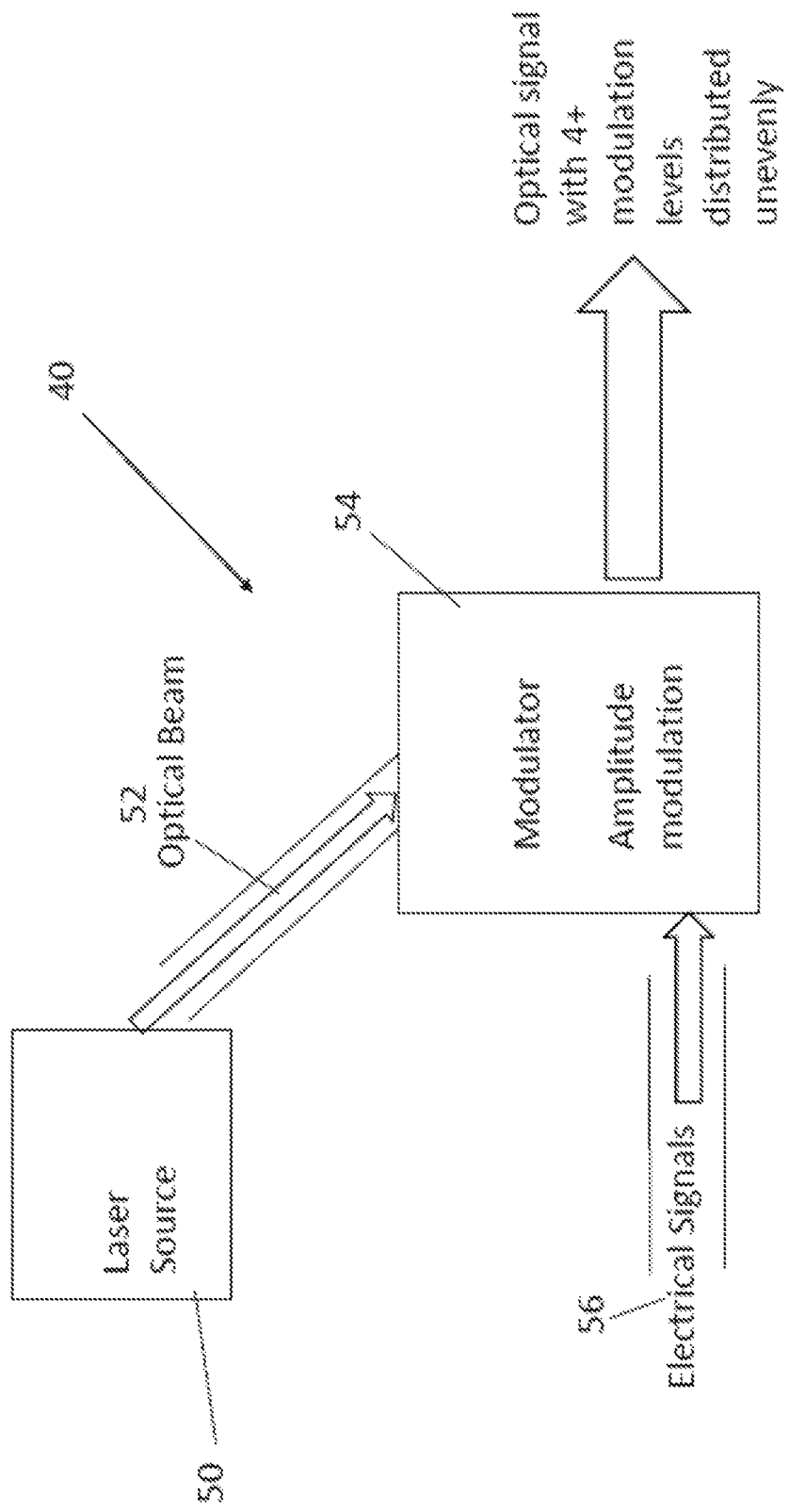
FIG. 2 is a simplified diagram of a transmission system according to an embodiment of the present disclosure.

Referring now to the drawings, FIG. 2 illustrates an optical transmission system 40 for multi-level PAM. The system comprises a laser source 50 providing an optical beam 52 to modulator 54. A signal source provides electrical signals 56 which need to be transmitted onwards along the optical fibers and thus have to be modulated onto the optical beam. Modulator 54 is connected to both the laser source 50 and the source of the electrical signals 56. The modulator 54 modulates the electronic signals onto the optical beam 52 using amplitude modulation and four or more (4+) signal levels.

The signal levels are non-uniformly distributed. For example, the signal levels of the modulation may be distributed so that the results after squaring and transformation are uniformly or substantially uniformly distributed. The signal levels may be chosen to minimize a BER when a given standard noise deviation is added to the signal.

Dynamic level allocation may be used in which the signal levels used for the modulation may be changed during the transmission.

In dynamic level allocation, an initial signal level selection may for example use a pre-estimated standard noise deviation, and the modulator may obtain actual standard noise deviations being experienced in the channel to update the signal level selection during transmission.

The actual standard noise deviation may be obtained from:

$$\sigma = \frac{1}{4}\sum_{i=0}^{3} \sigma_i / \mathrm{abs}(2(ax_i^{1/2} + 2bx_i^{3/2})),$$

where a, b and $x_i$ values are measured from the received signal, $\sigma_i$ values are estimated from histograms around four reconstructed levels, and a+b=1. i=0, 1, 2, 3 and is the PAM-4 level at the transmitter side, a and b are parameters used for calculating $x_i$, and $\sigma_i$ is the noise standard deviation of the $i^{th}$ reconstructed PAM-4 level at the receiver side.

Exemplary values for the four levels are 0, 0.2346, 0.5297, and 1.

The transmission system of FIG. 2 may be incorporated into a transmitter optical subsystem or TOSA.

The modulator may use a DAC. Each PAM-4 level is defined by 2 bits. For level optimization the four levels (0, 1, 2, 3) may be transformed into four new levels from 0 to 1. In order to carry out the conversion high-level resolution DAC of say 6 bits is needed.

In an embodiment, the modulation scheme may use PAM-8 instead of PAM-4. In such a case levels need to be mapped and three bits may be needed. In an embodiment, the modulation scheme may use PAM-16 instead of PAM-4. In such a case levels need to be mapped and four bits may be needed.

Figure 3:
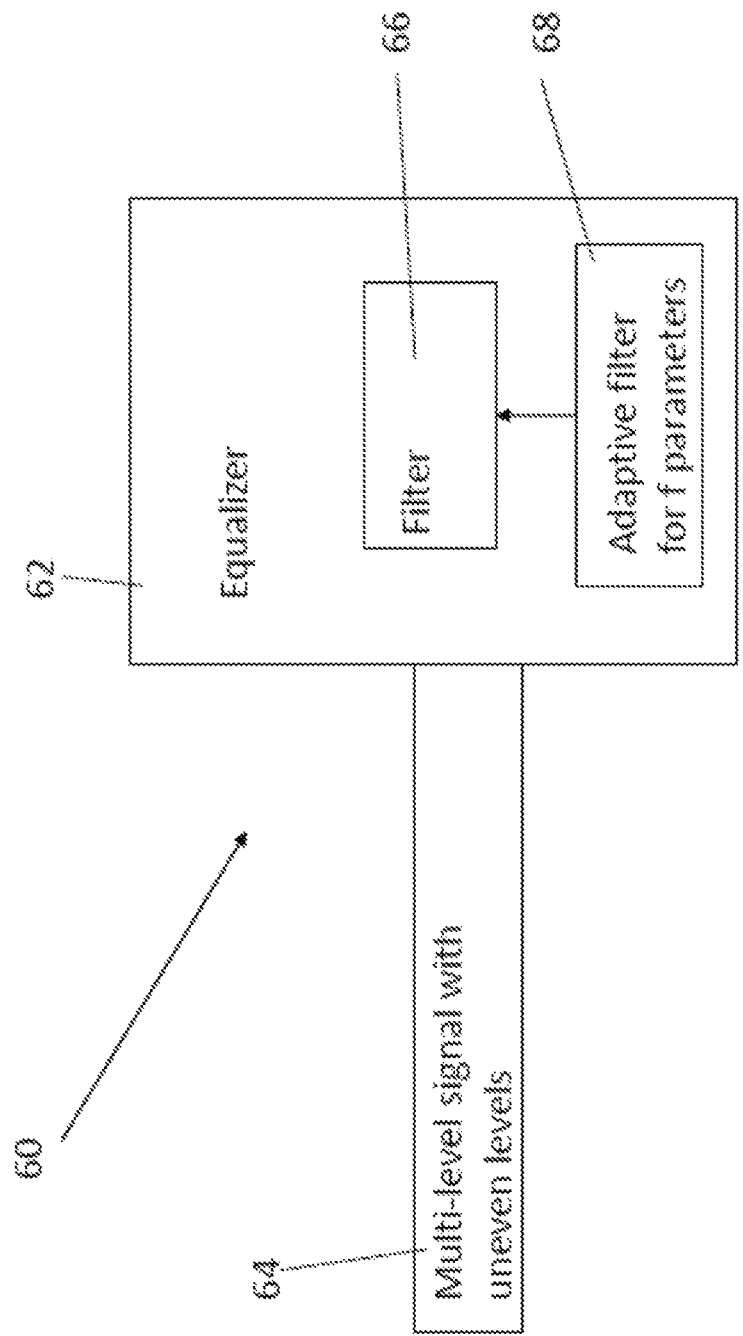
FIG. 3 is a simplified diagram of a receiving system according o an embodiment of the present disclosure.

Reference is now made to FIG. 3 which is a simplified schematic diagram illustrating an optical receiving system 60 comprising an equalizer 62.

The equalizer equalizes a multi-level PAM signal 64 as produced by the modulator of FIG. 2 in which the modulation signal levels are unevenly distributed and after passing over optical fibers and repeaters that add noise.

The equalizer may contain an implementation 66 of a filter of the form:

$$f_1 y + f_2 y^2 + f_0,$$

where y is the incoming signal including all accumulated noise and the parameters $f_0$, $f_1$ and $f_2$ are obtained using an adaptive filter 68.

The parameters used in the filter 66, may be as follows:

$$g = f_1 y + f_2 y^2 + f_0 = ax + bx^2$$

$$f_1 = (a - 2cd)/c$$

$$f_2 = b/c^2$$

$$f_0 = -d(a - 2cd)/c - d^2,$$

wherein a, b are known, y is the received signal and c and d are unknowns which the adaptive filter generates.

The incoming signal may be scaled by a factor K and biased by $K_0$.

In an embodiment, the equalizer 62 may be an implementation of a second order Volterra filter.

The equalizer 62 may be implemented as a three-tap equalizer, as discussed herein below with respect to FIG. 11.

The transmitter and the receiver may be combined into a communication system.

As explained, an optical beam 52 is provided. Electrical signals 56 are modulated onto the optical beam using amplitude modulation and four or more unevenly distributed signal levels.

The result is then transmitted over optical fiber and passes repeaters where the signal is amplified, with the side effect of adding noise.

The way in which the noise affects the signal is now considered in greater detail.

The squaring of the received signal provides several terms:

$$y = (x^{1/2} + n)^2 = x + 2x^{1/2}n + n^2 \approx x + 2x^{1/2}n$$

$$y^2 = x^2 + 6xn^2 + n^4 + 4x^{3/2}n + 4x^{1/2}n^3$$

The terms including a noise part of order higher than 1. Terms in which the noise part is raised to a power, viz $n^2$, $n^3$, $n^4$, have smaller contributions so that one can approximate:

$$y^2 \approx x^2 + 4x^{3/2}n.$$

Let us introduce two new variables a and b, and derive a new signal z as:

$$z = ay + by^2 \approx ax + 2ax^{1/2}n + bx^2 + 4bx^{3/2}n$$

$$z \approx ax + bx^2 + 2ax^{1/2}n + 4bx^{3/2}n = w + kn$$

$$w = ax + bx^2$$

$$k = 2ax^{1/2} + 4bx^{3/2}$$

If w has uniform levels 0, 1/3, 2/3, and 1 we can solve the set of equations to calculate PAM-4 levels. However, we obtain only three equations and four unknowns with the condition $1 > x_2 > x_1 > 0$:

$$1 = a + b$$

$$1/3 = ax_1 + bx_1^2$$

$$2/3 = ax_2 + bx_2^2.$$

However, a new condition can be introduced that is related to the optimization, of m:

$$m = k/2 = ax^{1/2} + 2bx^{3/2}.$$

It is impossible to find a closed-form solution. Therefore, we may instead use some plotted functions to indicate the optimum solutions. Such plotted functions are shown in FIG. 4A, to which reference is now made. FIG. 4A shows Levels of $x_1$ and $x_2$ versus the parameter b. For b=0, and corresponding to a=1 we the get uniform levels of the other approaches.

The optimization of m can be done so that BER is minimized for all four levels. If we include only errors between neighboring levels then BER for ASE noise and standard deviation σ can be calculated by:

$$BER \approx \left(\sum_{i=1}^{3} 0.5\, \mathrm{erfc}(Q_i/\sqrt{2})\right)\Big/3$$

$$Q_i = \frac{w_i - w_{i-1}}{\sigma_i + \sigma_{i-1}},\, i = 1, 2, 3$$

$$w_i = i/3,\, i = 0, 1, 2, 3$$

$$\sigma_i = \sigma\, \mathrm{abs}(2(ax_i^{1/2} + 2bx_i^{3/2})).$$

Figure 4B:
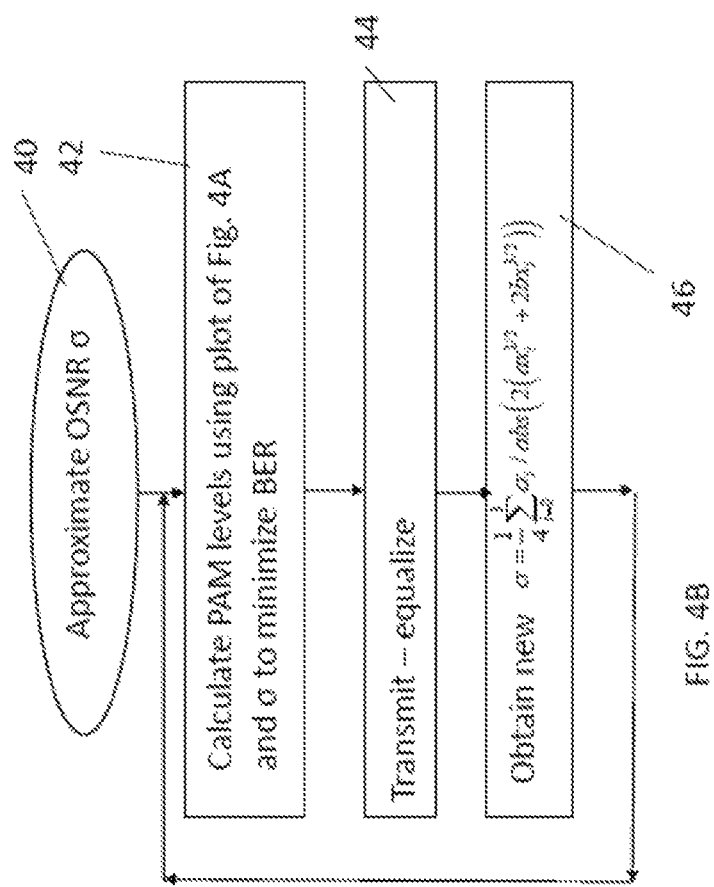
FIG. 4B is a simplified flow chart showing a process for dynamically setting signal levels to minimize BER using the plot of FIG. 4A.
Figure 4A:
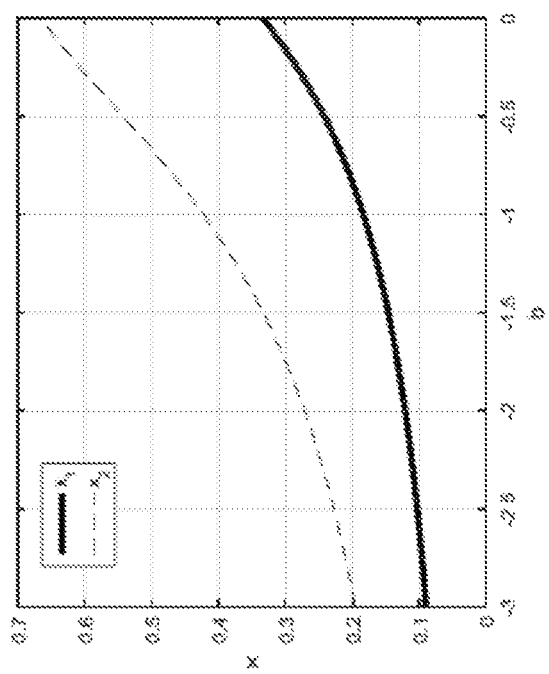
FIG. 4A is a plot of signal levels against a parameter b to minimize BER according to embodiments of the present disclosure.

Reference is now made to FIG. 4B which is a simplified flow chart showing a method for carrying a multi-level PAM optimization procedure.

The OSNR value is approximately known in advance such that a preset starting level can be used in step 40.

Thus, at the start we assume some OSNR value i.e. σ and based on this value the multiple PAM levels, say the four levels of PAM-4, are calculated in step 42. The transmitted signal is mapped onto these levels, and is transmitted and then equalized in step 44.

As the received signal is equalized, the actual parameter n of the received signal can be easily estimated in step 46 using:

$$\sigma = \frac{1}{4}\sum_{i=0}^{3} \sigma_i / \text{abs}(2(ax_i^{1/2} + 2bx_i^{3/2})),$$

where $\sigma_i$ values are estimated from histograms around four reconstructed levels.

The new σ value is then sent to the transmitter and the optimum/new PAM levels are recalculated and then used. The process may be repeated at regular intervals or when the noise levels change or when the error rate appears to be increasing or when any other suitable system change is detected.

Figure 6:
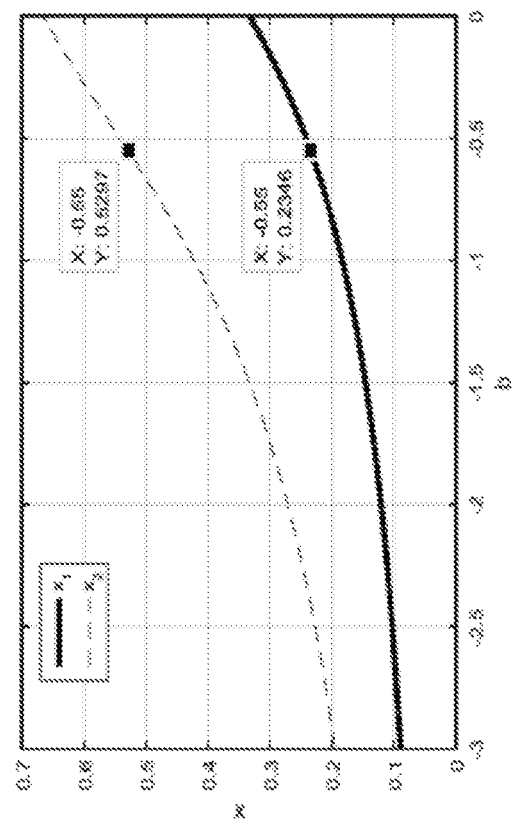
FIG. 6 is a schematic plot of parameters $x_1$ and $x_2$ levels between b=−3 and 0, and particularly showing the levels for b=−0.5.
Figure 5:
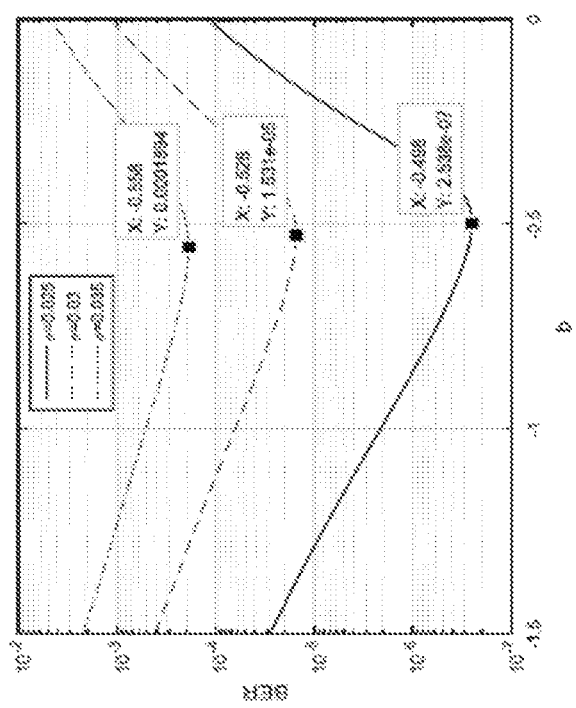
FIG. 5 is a plot of BER against the parameter b.

Reference is now made to FIG. 5, which shows a plot of BER versus b. The optimum b depends on the working range i.e. on the amount of ASE noise (σ). We select b=−0.55 to estimate the PAM-4 performance in simulations. This value will provide almost the optimum BER. In this case, the parameters are $x_1$=0.2346 and $x_2$=0.5297, as shown in FIG. 6. FIG. 6 illustrates parameters $x_1$ and $x_2$ levels between b=−3 and 0, and particularly showing the levels for b=−05.

The received signal without noise can be reconstructed by:

$$w = ax + bx^2.$$

However, the received signal is usually in the form:

$$y = cx + d,$$

and if we want to obtain the transmitted signal directly we have:

$$ay + by^2 = (ac + 2bcd)x + bc^2x^2 + ad + bd^2 = k_1x + k_2x^2 + k_0.$$

This will however not provide the correct signal. The signal can be regenerated by a filter:

$$g = f_1 y + f_2 y^2 + f_0 = ax + bx^2$$

$$f_1 = (a - 2cd)/c$$

$$f_2 = b/c^2$$

$$f_0 = -d(a - 2cd)/c - d^2.$$

The signal g may be the transmitted signal scaled by a factor K and biased by $K_0$:

$$g = w_1 y + w_2 y^2 + w_0 = K(ax + bx^2) + K_0.$$

For K=6 and $K_0$=−3 we obtain PAM-4 levels −3, −1, +1, and +3 for x=0, 1/3, 2/3, 1. The parameters $w_0$, $w_1$, and $w_2$ can be found using an adaptive filter. When the received signal suffers from linear and nonlinear distortion the second-order Volterra filter can be used to equalize the signal. This filter includes three coefficients in the last equation $f_0$, $f_1$, and $f_2$.

When a Volterra filter is used the signal y is a vector of N samples. There are N $f_{1,t}$ coefficients and N2 $f_{2,t}$ coefficients. N2 itself depends on the specific filter structure.

An P-th order discrete Volterra filter with input x, output y, and memory length M can be described as:

$$y(k) = w_{dc} + \sum_{r=1}^{P}\sum_{k_1=0}^{M-1}\cdots\sum_{k_r=k_{r-1}}^{M-1} w_r(k_1, k_2, \ldots, k_r) \times x(k-k_1)\ldots x(k-k_r),$$

where $w_r$ are r-th order Volterra kernels. Volterra kernels are symmetric, which may be exploited by considering only coefficients with non-decreasing indices $k_r$, i.e. $k_r \geq k_{r-1}$. In this case, the number of Volterra coefficients can be calculated by:

$$1 + \sum_{r=1}^{P}\binom{M+r-1}{r}.$$

As there are $o(M^P)$ coefficients in the polynomial expression, even for moderately large values of M and P the implementation complexity becomes extremely high, thus, only low-order Volterra filters are considered for real systems. In DD optical systems, the restricted third-order Volterra filter seems to be sufficient to compensate electrical and optical linear and nonlinear impairments and is described by:

$$y(k) = w_{dc} + \sum_{k_1=0}^{M_1-1} w_1(k_1)x(k-k_1) + \sum_{k_1=0}^{M_2-1}\sum_{k_2=0}^{M_2-1} w_2(k_1,k_2)x(k-k_1)x(k-k_2) + \sum_{k_1=0}^{M_3-1}\sum_{k_2=k_1}^{M_3-1}\sum_{k_3=k_2}^{M_3-1} w_3(k_1,k_2,k_3)x(k-k_1)x(k-k_2)x(k-k_3).$$

Figure 8:
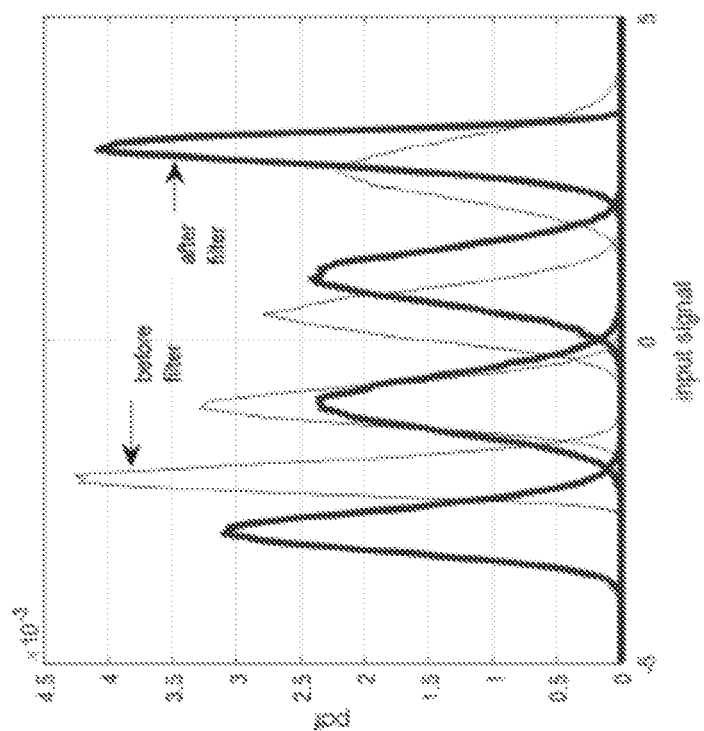
FIG. 8 is a schematic plot of probability density function before and after filtering using level mapping according to the present embodiments and illustrating a clear distinction between the separate levels after filtering.
Figure 7:
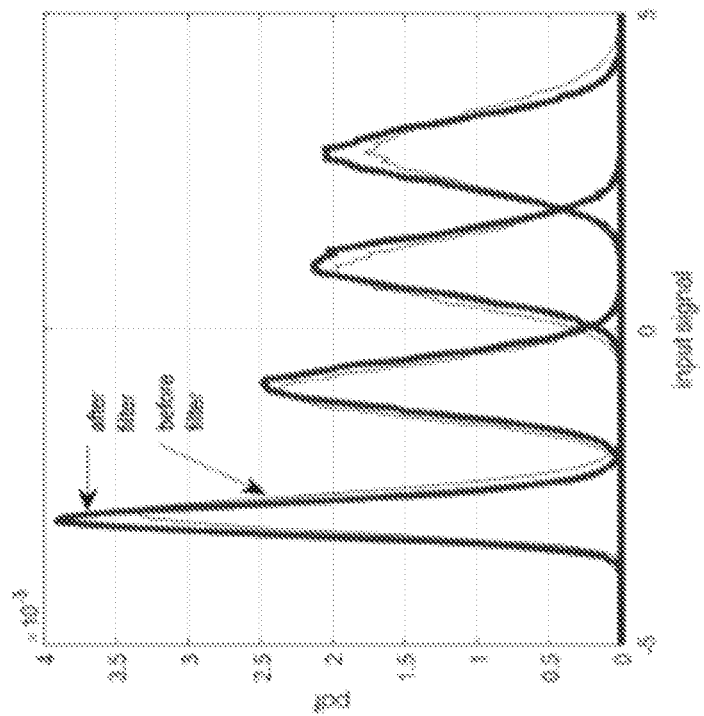
FIG. 7 is a schematic plot of probability density function before and after filtering using classical mapping.

FIG. 7 is a plot of the probability density function for PAM 4 with classical mapping both before and after filtering. FIG. 8 shows the equivalent probability density functions after equalization according to the non-uniform mapping of the present embodiments. With uniform mapping, the equalizer does not improve performance and BER is critical between the two largest levels. In non-uniform mapping according to the present embodiments, before equalization, BER is high between the lower levels. However, after equalization, this is not the case and BER is very similar between all the neighboring levels.

It is noted that the level +1 may be shifted to the right. This may affect the mapping rules but it is not critical when the shift is small. With suitable mapping, the shift may slightly improve BER.

Figure 9:
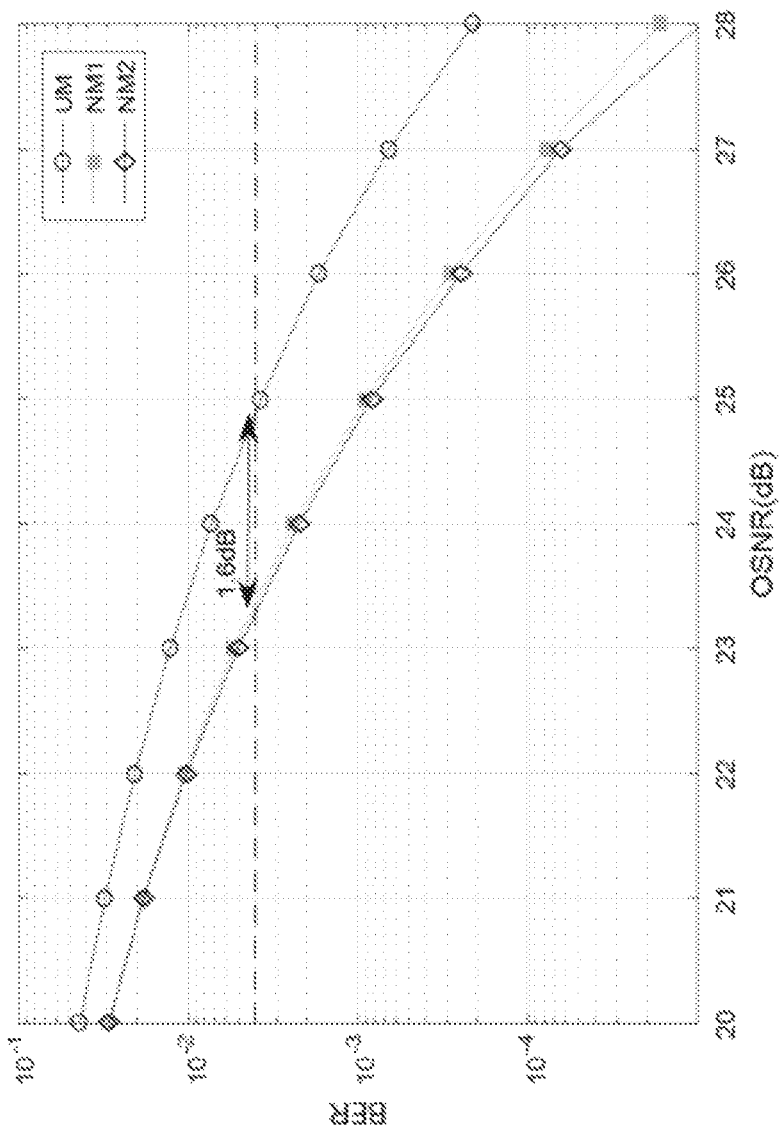
FIG. 9 is a schematic plot of BER against signal to noise ratio for classical mapping and for two mapping schemes according to the present embodiments.

As shown in FIG. 9, a simulation was carried out of an optical link with EML (11 decibels (dB) extinction ratio) and PIN. The non-uniform mapping (NM1, b=−0.55) performance shows an improvement compared with the uniform mapping (UM). The gain at a BER of 0.004 is about 1.6 dB in OSNR. This gain can be increased by a small shift of the level +1 on the right (NM2). The gain obtained by the +1 level shift is not significant but is at least visible.

Figures 10, 11:
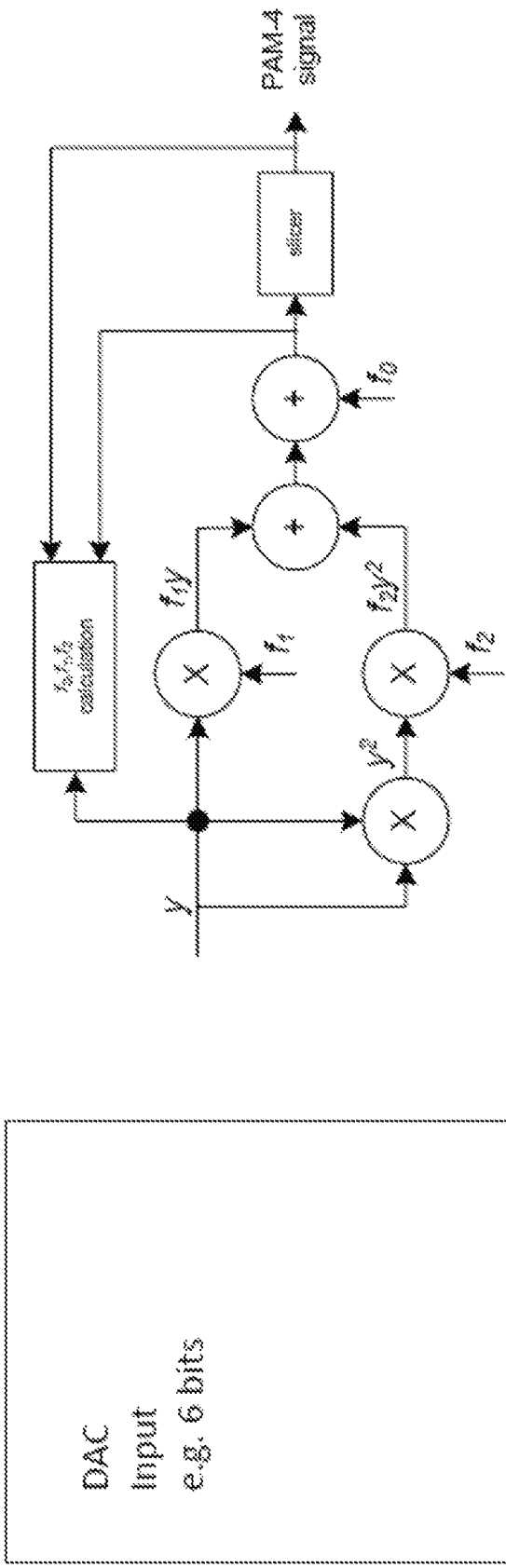
FIG. 10 illustrates a transmit side modulator constructed from a DAC.
FIG. 11 is a schematic diagram of a three-tap equalizer that may be used at the receiving side according to the present embodiments.

FIG. 10 shows a DAC used at the transmit side. PAM-4 may need more than the resolution provided by a 2-bit DAC as used by the other approaches and two level PAM. As discussed above, Each PAM-4 level is defined by 2 bits. Following level optimization the initial evenly spaced levels (0, 1, 2, 3) may be transformed into four new levels which are unevenly spaced between 0 and 1. In order to carry out modulation, a high-level resolution DAC of for example 6 bits may be used.

For the specific case where the modulation levels are set at 0, 0.2346, 0.5297, and 1, in order to encode to two significant figures the DAC may use 7 bits and 128 states. In most cases, reasonable performance may be obtained using 6 bits.

PAM-8 requires 3 bits for uniform mapping. When levels are optimized as per the present embodiments then more bits are required. At a minimum one more bit is required. However, in practice at least 3 additional bits are required on top of the one more to give seven bits.

Performance may be sacrificed slightly if needed to reduce complexity. FIG. 11 illustrates a three-tap filter which can be used at the receiver end in the present embodiments to provide equalization according to the above-described embodiments.

It is expected that during the life of a patent maturing from this application many relevant optical transmission, amplification and reception technologies will be developed and the scopes of the corresponding terms are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was further and individually indicated to be incorporated herein by reference. In addition, citation or identification of any reference in this application shall not be construed as an admission that such reference is available as other approaches to the present disclosure. To the extent that section headings are used, they should not be construed as necessarily limiting.

What is claimed is:

1. An optical transmission system for multi-level pulse amplitude modulation (PAM), the optical transmission system comprising:
a laser source configured to provide an optical beam;
a signal source coupled to the laser source and configured to generate a plurality of electronic signals; and
a modulator circuit coupled to the laser source and the signal source and configured to:
modulate the electronic signals onto the optical beam using amplitude modulation and at least four signal levels to obtain a multi-level PAM signal, wherein the at least four signal levels are non-uniformly distributed;
select the at least four signal levels to minimize a bit error rate (BER) based on a given standard noise deviation that is added to the multi-level PAM signal; and
distribute the at least four signal levels such that the at least four signal levels are substantially uniformly distributed upon squaring and transformation.

2. The optical transmission system of claim 1, wherein the modulator circuit is further configured to distribute the at least four signal levels such that the at least four signal levels are substantially uniformly distributed upon squaring and transformation, wherein the at least four signal levels are transformed into four new levels ranging from 0 to 1.

3. The optical transmission system of claim 1, wherein the at least four signal levels are 0, 0.2346, 0.5297, and 1.

4. The optical transmission system of claim 1, wherein the modulator circuit is further configured to select the at least four signal levels by setting; a pre-estimated standard noise deviation as an initial signal level selection.

5. The optical transmission system of claim 4, wherein the modulator circuit is further configured to select the at least four signal levels by obtaining actual standard deviations to update the initial signal level selection.

6. The optical transmission system of claim 5, wherein the modulator circuit is further configured to obtain the actual standard deviations using the following formula:

$$\sigma = \frac{1}{4}\sum_{i=0}^{3} \sigma_i / \text{abs}(2(ax_i^{1/2} + 2bx_i^{3/2})),$$

wherein a, b and $x_i$ values are measured from a received signal, and wherein $\sigma_i$ values are estimated from histograms around four reconstructed levels.

7. The optical transmission system of claim 1, wherein the optical transmission system is comprised in a transmitter optical subassembly (TOSA).

8. The optical transmission system of claim 1, wherein the modulator circuit comprises a digital-to-analog converter (DAC) configured to perform the amplitude modulation using at least six input bits.

9. The optical transmission system of claim 1, wherein the at least four signal levels comprise eight modulation levels.

10. An optical transmission method for multi-level pulse amplitude modulation (PAM), the optical transmission method comprising:
providing an optical beam;
providing a plurality of electronic signals to be modulated onto the optical beam;
modulating the electronic signals onto the optical beam using amplitude modulation and at least four signal levels to obtain a multi-level PAM signal, wherein the at least four signal levels are non-uniformly distributed;
selecting the at least four signal levels to minimize a bit error rate (BER) based on a given standard noise deviation that is added to the multi-level PAM signal; and
distributing the at least four signal levels such that the at least four signal levels are substantially uniformly distributed upon squaring and transformation.

11. The optical transmission method of claim 10, wherein the at least four signal levels comprise eight signal levels.

12. The optical transmission method of claim 10, wherein the at least four signal levels are 0, 0.2346, 0.5297, and 1.

13. The optical transmission method of claim 10, further comprising setting a pre-estimated standard deviation to make an initial level distribution.

14. The optical transmission method of claim 13, further comprising obtaining actual standard deviations from a received signal to update the initial level distribution.

15. The optical transmission method of claim 14, further comprising obtaining the actual standard deviations using the following formula:

$$\sigma = \frac{1}{4}\sum_{i=0}^{3} \sigma_i / \mathrm{abs}(2(ax_i^{1/2} + 2bx_i^{3/2})),$$

wherein a, b and $x_i$ values are measured from the received signal, and wherein $\sigma_i$ values are estimated from histograms around four reconstructed levels.

16. The optical transmission method of claim 10, further comprising performing the amplitude modulation using a 6-bit digital-to-analog converter (DAC).

17. The optical transmission method of claim 11, wherein the eight levels are 0, 0.0985, 0.2044, 0.3198, 0.4478, 0.5937, 0.7681, and 1.

18. An optical communication method for multi-level pulse amplitude modulation (PAM), the optical communication method comprising:

providing an optical beam;

providing a plurality of electronic signals to be modulated onto the optical beam;

modulating the electronic signals onto the optical beam using amplitude modulation and at least four signal levels to obtain a multi-level PAM signal, wherein the at least four signal levels are non-uniformly distributed;

equalizing the multi-level PAM signal such that bit error rate (BER) is substantially similar between neighboring levels among the at least four signal levels; and distributing the at least four signal levels such that the at least four signal levels are substantially uniformly distributed upon squaring and transformation.

19. The optical communication method of claim 18, wherein the multi-level PAM signal is equalized using one of a three-tap equalizer or an implementation of a second order Volterra fitter.

20. The optical communication method of claim 18, further comprising selecting the at least four signal levels to minimize a bit error rate (BER) based on a given standard noise deviation that is added to the multi-level PAM signal.

* * * * *